May 3, 1949.  W. P. LEAR  2,469,269
UNITARY MECHANICAL ACTUATOR DEVICE
Filed April 17, 1943  3 Sheets-Sheet 1
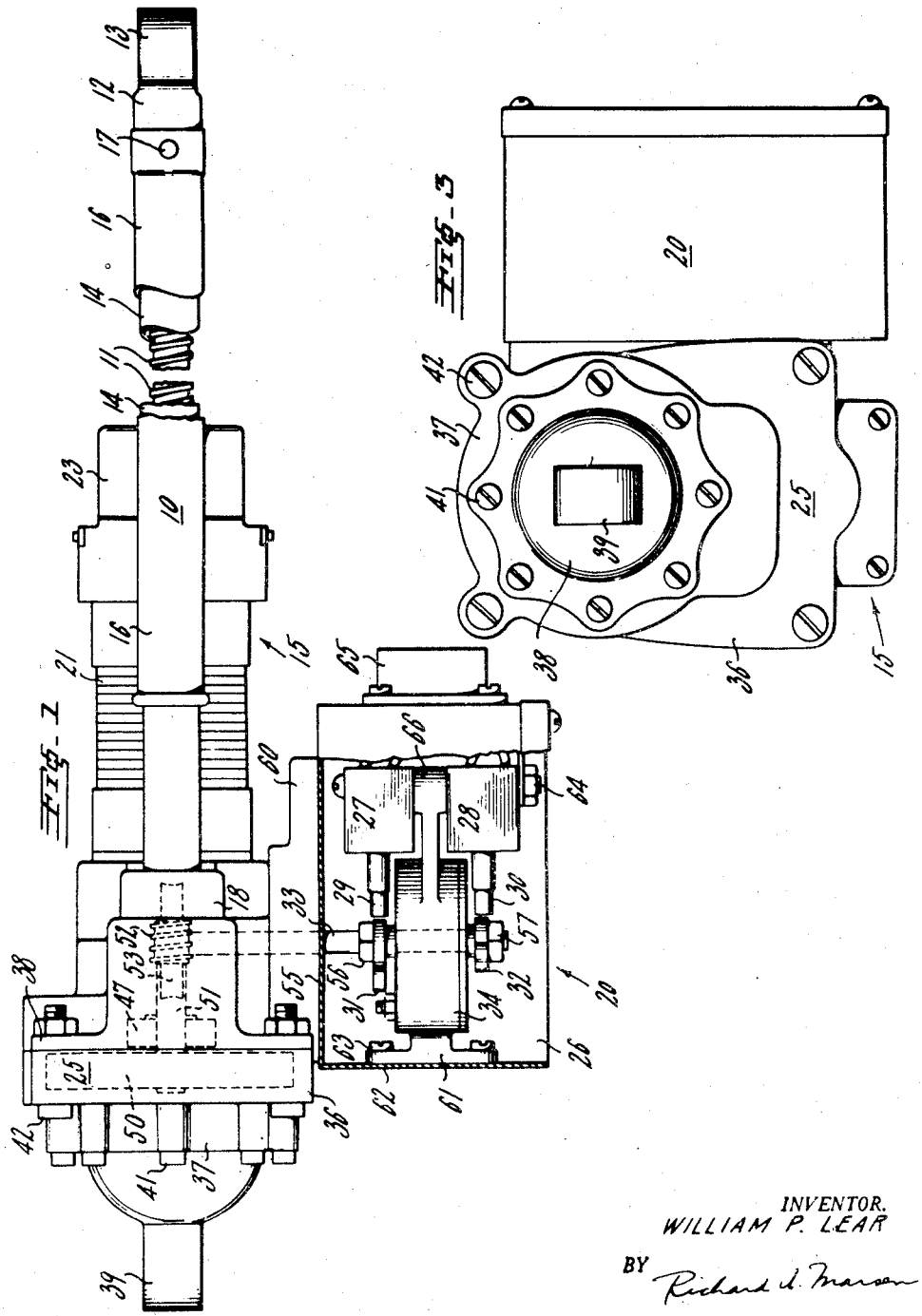
INVENTOR.
WILLIAM P. LEAR
BY Richard A. Marsen
his ATTORNEY

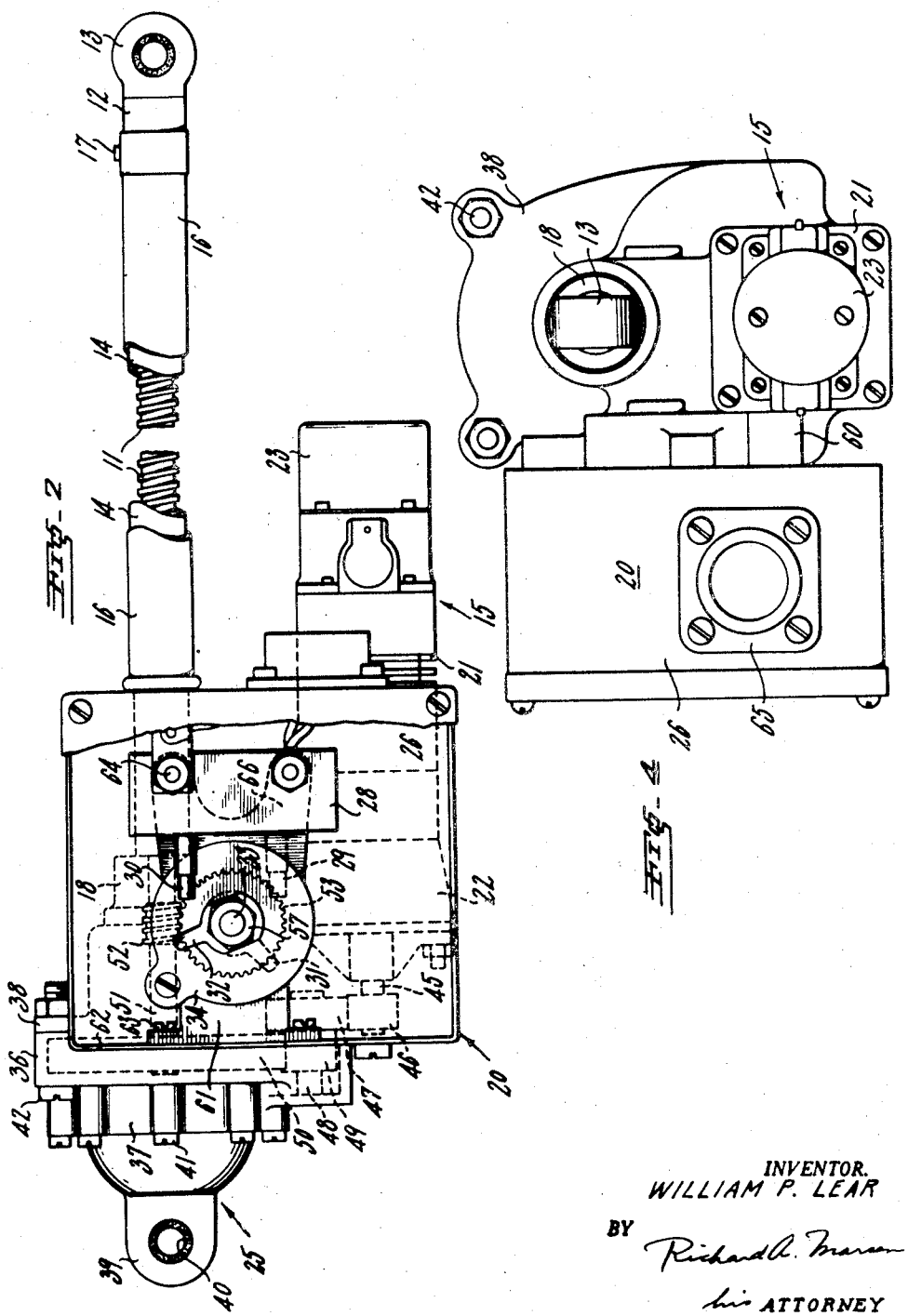

May 3, 1949.  W. P. LEAR  2,469,269
UNITARY MECHANICAL ACTUATOR DEVICE
Filed April 17, 1943  3 Sheets-Sheet 3

INVENTOR.
WILLIAM P. LEAR
BY
Richard A. Marsan
his ATTORNEY

Patented May 3, 1949

2,469,269

UNITED STATES PATENT OFFICE 2,469,269

UNITARY MECHANICAL ACTUATOR DEVICE

William P. Lear, Piqua, Ohio, assignor, by mesne assignments, to Lear, Incorporated, Grand Rapids, Mich., a corporation of Illinois Application April 17, 1943, Serial No. 483,515

7 Claims. (Cl. 192—143)

This invention relates to a linear actuator unit, and more particularly to such a unitary device comprising a jack screw, a power drive means and limit control mechanism therefor. The present application is a continuation-in-part of my Patent No. 2,319,463 issued May 18, 1943 and Patent No. 2,403,092 issued July 2, 1946 both assigned to the same assignee as this application.

While the actuator unit of the present invention is adapted for general use, it is particularly applicable for use aboard aircraft for remotely controlling the position of movable members thereof. Modern airplanes are provided with various movable components such as retractable landing gear, oil intercooler doors, cowl flaps and wing flaps. Such components are usually hingedly mounted on a fixed portion of the aircraft, and the position thereof preferably is remotely controllable from a location adjacent the pilot's seat or automatically. Recent military experience has shown that hydraulic controls sometimes used for this purpose are not reliable because of ready destruction of a hydraulic line due to vibration or being shot away, resulting in many components becoming inoperative. When mechanical actuators have been used, difficulty has been experienced in installing and properly aligning the same with the devices to be operated, and after installation, considerable looseness develops due to vibration which detracts from the stability or even proper operation of the components. The compact, lightweight, individual actuator unit for each accessory to be operated is therefore more desirable.

It is among the objects of this invention to provide an actuator unit, including a linear actuator, power drive means and control mechanism secured together as a unit; to provide such a unit including a jack screw operable by an electric motor and limit control mechanism operable by the jack screw for interrupting the energization of the electric motor and disconnecting it from the jack screw after predetermined actuation of the jack screw in either direction; to provide a linear actuator and power drive means therefor including adjustable means selectively operable to interrupt the energization of the power drive means and disconnect it from the actuator after a predetermined movement of the actuator in either direction; to provide a linear actuator including a power drive means therefor and an electromagnetic clutch operative upon energization of the power drive means to connect the drive means to the actuator; and to provide a compact, foolproof and lightweight linear actuator unit incorporating mounting means at either end whereby the unit may be directly disposed between a member to be actuated and the support.

These and other features, objects and advantages of the invention will be apparent from the following description and accompanying drawings, in which:

Fig. 1 is a top plan view with parts broken away of a linear actuator unit embodying the invention.

Fig. 2 is a side elevation, with parts broken away, of the actuator unit illustrated in Fig. 1.

Fig. 3 is a left end elevational view of the actuator unit illustrated in Fig. 1.

Fig. 4 is a right end elevational view of the actuator unit illustrated in Fig. 1.

Figure 5:
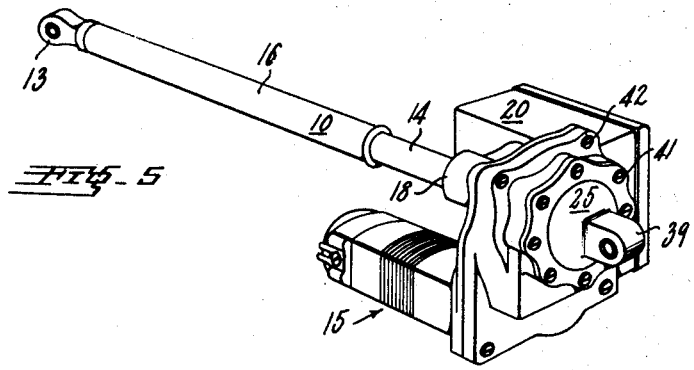
Fig. 5 is a perspective view of the actuator unit of Figs. 1 to 4.

Generally speaking, the actuator unit of the present invention comprises a linear actuator, such as a jack screw, a power drive means such as an electric motor and electromagnetic clutch, for effecting the extension and retraction of the actuator, and control mechanism for interrupting the energization of the power drive means and electromagnetic clutch to disconnect the power drive means from the actuator after a predetermined actuation of the linear actuator in either direction. These elements are all secured together as a unitary device, as by being mounted on a gear housing containing gearing connecting the drive means to the actuator for effecting extension and retraction thereof, and for operating the control mechanism. Mounting means are provided on the gear housing and on the outer end of the actuator so that, when the unit is mounted in position to control the relative angular displacement of members to be actuated, the unit will be disposed directly between such members. If desired, the mounting means may include resilient members to facilitate installation and alignment of the unit, and to absorb shocks and vibrational stresses, as disclosed in my copending application Serial No. 481,980, filed April 6, 1943 now abandoned. The control mechanism includes switch means for interrupting the energization of the motor and clutch, and these switch means are actuated by adjustable cams operated by the gearing in the gear housing. The adjustable cams permit the control mechanism to be set to interrupt the motor and clutch circuit after a predetermined movement of the linear actuator in either direction.

The actuator may comprise a jack screw including a screw, an internally threaded extension member, and protecting means for the screw. The power drive means preferably comprises an electric motor and an electromagnetic clutch arrangement. The motor is connected to the actuator through the electromagnetic clutch and through the medium of gearing disposed in a gear housing. The control mechanism preferably includes one or more limit switches connected in the energizing circuit for the electric motor and electromagnetic clutch, and operated by means of a limit switch actuator which is connected to gearing in the gear housing.

Referring more specifically to the drawings, the unit comprises a linear actuator 10, power drive means 15, control mechanism 20, and a gear housing 25, to which the other elements are secured to effect a unitary compact arrangement. The actuator 10 comprises a threaded member such as a screw 11, to the outer end of which is secured a mounting means 12 having an apertured lug 13 which may be secured either to a relatively fixed support or to a member movable with respect to such support. The screw 11 is operatively associated with an extension tube or sleeve 14 which may be internally threaded or which may have a nut fixed therein. Suitable protecting means, such as dust sleeve 16, may be secured to the mounting means 12 by a screw 17, and is arranged in telescoping relation with the extension tube 14 to fully enclose the screw in all positions of the actuator. The extension tube 14 may be secured by a coupling member 18 to gearing in the gear housing 25 so that, upon rotation of the gearing, the screw 11 will be either extended or retracted relative to the tube 14.

The drive means 15 may comprise an electric motor 21 including an electromagnetic clutch-brake unit 22 which, upon energization of the motor, is adapted to connect the motor armature to gearing in the gear housing 25 and upon de-energization to engage a brake to arrest motion of the gearing. A suitable motor and clutch arrangement is described and claimed in my Patent No. 2,267,114 issued December 23, 1941, and assigned to the assignee of the present invention. A thermal control 23 may be incorporated in the motor as a protection against overheating thereof.

The control mechanism 20 is disposed in a housing 26, mounted on gear housing 25, and includes, in the illustrated embodiment of the invention, a pair of limit switches 27 and 29 having operating plungers 29 and 30, respectively. Switches 27 and 28 are preferably of the type known as micro-switches, whereby relatively large motor currents may be interrupted by a small displacement of their plungers. Plungers 29 and 30 are adapted to be engaged by cams 31 and 32 respectively. Cams 31 and 32 are adjustably mounted on a shaft 33 forming part of limit switch actuator 34.

Gear housing 25 comprises a body member 36, a retainer and mounting plate 37 and an end plate 38. As will be described more particularly hereinafter, suitable gearing is disposed in the gear housing for operating the actuator 10 and the limit switch actuator 34. The retainer or mounting plate 37 is formed with a mounting means, such as an apertured lug or ear 39, adapted to be secured either to a relatively fixed support, or to a relatively movable member. A bushing or sleeve 40 of resilient material such as rubber may be secured in the aperture of lug 39. The retainer is secured to the body member 36 by means of screws 41, and bolts 42 secure the end plate 38 to the body member.

The motor 21 is provided with an armature which is mechanically coupled, upon energization of electromagnetic clutch 22, to a shaft 45 on which is a pinion 46. Pinion 46 engages a pinion 47 on a counter-shaft 48 mounted in the body member 36 and end plate 38. Another pinion 49 on counter-shaft 48 meshes with a large gear 50 on a shaft 51 extending from the body member 36 through the end plate 38 to the coupling member 18. A worm 52 mounted on shaft 51 operatively engages a worm gear 53 mounted on shaft 33 which extends through one wall 55 of the housing 26 into the gear housing 25, and is mounted in bearings in housing 25 and limit switch actuator 34. The cams 31 and 32 are adjustably mounted on the shaft 33, on either side of the actuator 34, and are secured in any desired preset adjusted position by nuts 56 and 57. Thereby, the cams may be adjusted to actuate switches 27 and 28 at any predetermined point during the extension or retraction of linear actuator 10.

It should be understood that the limit switch actuator 34 may be driven in any suitable manner, and that additional gearing may be included in the actuator housing to effect any desired speed reduction for cams 31 and 32. For instance, a worm gear could be provided in housing 34 and driven by shaft 33, or a pinion on shaft 33 could drive a large gear in housing 34. In any event, the invention is not limited to the particular gearing arrangement shown.

The end plate 38 of the gear housing 25 is formed with a mounting bracket 60 to which the housing 26 is secured. The limit switch actuator 34 is formed with a bracket 61 secured to a wall 62 of housing 26 by screws 63. A forked bracket 66 at the other end of the actuator 34 is secured to the limit switches 27 and 28 by bolt and nut devices 64. A suitable receptacle 65 is provided on the housing 26 to receive connections for the limit switches 27 and 28 and the motor 21.

Figure 6:
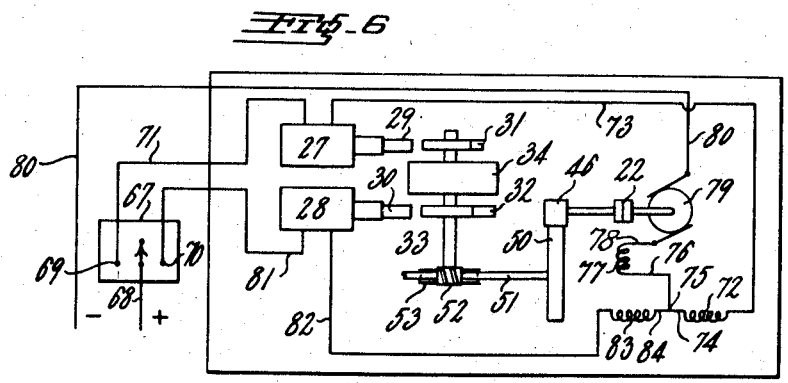
Fig. 6 is a diagrammatic representation of the control circuits and control mechanism actuating means for the linear actuator unit.

The circuit connections for the motor 21 are shown diagrammatically in Fig. 6. A control switch 67 is placed at any suitable location, preferably adjacent the pilot's seat, and includes a movable contact 68 which may be connected to one terminal of a suitable source of current such as the aircraft battery. The contact 68 is adapted to engage either one of a pair of contacts 69 and 70. A conductor 71 connects contact 69 to one terminal of limit switch 27, and the other terminal of switch 27 is connected to one end of motor field winding 72 by means of a conductor 73. A conductor 74 connects the opposite terminal of field winding 72 to a junction point 75, which is connected by conductor 76 to one side of the operating coil 77 for clutch 22. The opposite side of coil 77 is connected by a conductor 78 to one side of the armature 79 of motor 21, and a conductor 80 connects the opposite side of the motor armature to the other terminal of the source of electric current.

The other terminal 70 of switch 67 is connected by a conductor 81 to one side of limit switch 28, and a conductor 82 connects the other side of switch 28 to one end of motor field winding 83. The opposite end of field winding 83 is connected by a conductor 84 to the junction point 75. Upon movement of the contact 68 into engagement with contact 69, field winding 12, the clutch coil 77 and the armature 79 will be energized to effect connection of motor 21 to linear actuator 10 to effect extension of the linear actuator. Upon a predetermined extension of the actuator, the limit switch 27 will open to break the energizing circuit for the motor and clutch coil 77, thus deenergizing motor 21 and disconnecting it from actuator 10. Similarly, engagement between movable contact 67 and the other fixed contact 70 of the switch 67 will cause energization of motor 21 and clutch 22 to connect the motor to actuator 10 to effect retraction of the actuator, and, after a predetermined retraction of the actuator 10, the associated limit switch 28 will interrupt the energizing circuit for the motor and clutch to deenergize the motor and disconnect it from the actuator.

The clutch 22, including the operating coil 77 may well be of the type described and claimed in my Patent No. 2,267,114 referred to above. As described in said patent, this clutch is energized upon energization of the motor to mechanically couple the armature of the motor to the mechanism to be driven. Upon deenergization of the motor and the clutch, the driven clutch plate is preferably caused to engage a braking surface through spring action to effect substantially instantaneous stopping of the driven mechanism. Thus accurate positioning or actuation is effected by remote control. Of course, other forms of motors, such as shunt or compound wound motors, or either A. C. or D. C. motors, may be used; and other types of clutches may be substituted for the clutch 22.

Figure 7:
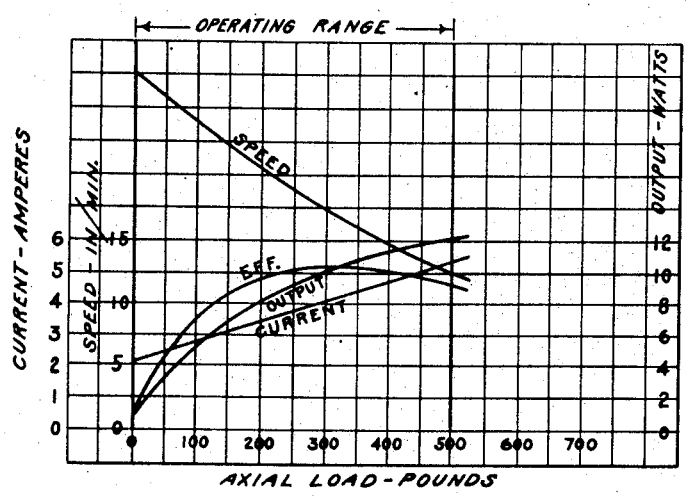
Fig. 7 is a typical performance curve chart for the linear actuator unit.

Fig. 7 illustrates typical performance curves for the linear actuator unit of the invention. In Fig. 7, such performance curves have been illustrated over the operating range of the actuator, which in the illustrated case may run from zero pounds axial or thrust load to 500 pounds axial load. The curves represent the output power of the actuator rated in watts, the current in amperes, the speed in inches per minute, and the relative efficiency throughout the operating range. It will be noted that the speed decreases substantially as a linear function of the axial load, and that the motor current, a series motor in this case, increases as a linear function of such load. The efficiency remains at a substantially constant value over a large portion of the operating range. The overall efficiency depends on the design of the unit, its gear down ratio, motor speeds, etc. In practice, efficiencies in the operating range of 10 to 50% and higher have been obtained with actuators of the design illustrated.

It will be noted that a compact, lightweight, efficient linear actuator unit has been provided which is admirably well adapted for use in controlling the position of individual components of an aircraft. The unit occupies less space than the remotely driven actuation devices heretofore used. Additionally, due to the provision of the adjustable cams and the control mechanism, when it is desired to operate a group of the actuator units in unison, such synchronous operation may be easily effected by proper adjustment of the cams on the operating shaft.

While a preferred embodiment of the invention has been selected for purposes of illustration, it will be understood that the invention may be otherwise embodied without departing from the principles thereof.

What is claimed is:

1. A linear actuator unit comprising, in combination, a gear housing; a linear actuator secured to said gear housing and including a pair of relatively rotatable and axially extensible threadedly engaged members; an electric motor secured to said gear housing; a control mechanism housing secured to said gear housing; gearing in said gear housing connected to one of said linear actuator members; an electromagnetic clutch secured to said motor and energized, upon energization of said motor, to connect said motor to said gearing to rotate said one member relative to the other member for effecting extension and retraction of said linear actuator when the other said member is held from rotation; switch means in said control mechanism housing selectively operable to interrupt the energization of said electric motor and electromagnetic clutch responsive to a predetermined actuation of said linear actuator; and means operatively associated with said gearing for actuating said switch means.

2. A linear actuator unit including a gear housing; a linear actuator secured to said gear housing and comprising an internally threaded extension tube and a screw operatively associated with said extension tube; power drive means secured to said gear housing; gearing in said gear housing connected to said extension tube; a clutch operative, when energized, to connect said power drive means to said gearing to rotate the said extension tube for effecting extension and retraction of said screw when said screw is held from rotation; and control mechanism secured to said gear housing and operable by said gearing to interrupt the energization of said power drive means and effect disengagement of said clutch after a predetermined actuation of said linear actuator.

3. A linear actuator unit comprising, in combination, a gear housing; a linear actuator secured to said gear housing and including a pair of relatively rotatable and axially extensible threadedly engaged members; an electric motor secured to said gear housing; gearing in said gear housing connected to one of said linear actuator members; an electro-magnetic clutch operatively associated with said motor and energized, upon energization of said motor, to connect said motor to said gearing to rotate said one member relative to the other member for effecting extension and retraction of said linear actuator when the other of said members is held from rotation; switch means mounted on said gear housing and interposed in the circuit of said electric motor and electromagnetic clutch; cams operatively associated with said switch means and selectively operable to actuate the same to interrupt the energization of said electric motor and electromagnetic clutch upon a predetermined actuation of said linear actuator; and a shaft mounting said cams and operatively associated with said gearing.

4. A linear actuator unit including, in combination, a gear housing; a linear actuator secured to said gear housing and comprising an internally threaded extension tube and a screw coacting therewith; power drive means secured to said gear housing; gearing in said gear housing connected to one of said linear actuator members; a clutch operative, when energized, to connect said power drive means to said gearing for effecting relative rotation of said extension tube and screw to extend and retract said linear actuator when one thereof is held against rotation;

control mechanism operable by said gearing to interrupt the energization of said power drive means and effect disengagement of said clutch upon a predetermined actuation of said linear actuator; and means enclosing said screw throughout its range of movement.

5. A linear actuator unit comprising, in combination, a gear housing including a mounting member, a body section and an end wall; a linear actuator secured at one end to said end wall; mounting means secured to the other end of said linear actuator; power drive means secured to said gear housing; gearing in said gear housing connected to one of said linear actuator members; a clutch operative, when energized to connect said power drive means to said gearing to effect extension and retraction of said linear actuator; and control mechanism mounted on said gear housing and operable by said gearing to interrupt the energization of said power drive means and effect disengagement of said clutch upon a predetermined cycle of actuation of said linear actuator, said linear actuator including a pair of telescoping sleeves, one of said telescoping sleeves being provided with a nut for effecting extension and retraction thereof when said one sleeve is held from rotation, and a screw operatively associated with said nut, and the other of said sleeves being secured against longitudinal movement relative to said screw.

6. A linear actuator unit, comprising, in combination, a gear housing; a linear actuator including a pair of relatively rotatable and axially extensible threadedly engaged members secured to said gear housing; an electric motor secured to said gear housing; gearing in said gear housing connected to one of said linear actuator members; an electro-magnetic clutch operatively associated with said motor and energized, upon energization of said motor, to connect said motor to said gearing to rotate said one member relative to the other member for effecting extension and retraction of said linear actuator when said other member is held from rotation; a pair of switches mounted on said gear housing and interposed in the circuit of said electric motor and electromagnetic clutch; a shaft operatively associated with said gearing; and a pair of cams adjustably mounted on said shaft and each operatively associated with one of said switches to actuate the same to interrupt the energization of said electric motor and electromagnetic clutch upon a predetermined cycle of actuation of said linear actuator.

7. A linear actuator unit comprising, in combination, a gear housing; a linear actuator including a pair of relatively rotatable and axially extensible threadedly engaged members secured to said gear housing; an electric motor secured to said gear housing; gearing in said gear housing connected to one of said linear actuator members; an electromagnetic clutch operatively associated with said motor and energized, upon energization of said motor, to connect said motor to said gearing to rotate said one member relative to the other member for effecting extension and retraction of said linear actuator when said other member is held from rotation; a pair of switches mounted on said gear housing and interposed in the circuit of said electric motor and said electromagnetic clutch; a shaft operatively associated with said gearing; and a pair of cams adjustably mounted on said shaft and each operatively associated with one of said switches to actuate the same to interrupt the energization of said electric motor and electromagnetic clutch upon a predetermined cycle of actuation of said linear actuator.

WILLIAM P. LEAR.

REFERENCES CITED

The following references are of record in the file of this patent:

UNITED STATES PATENTS

| Number | Name | Date |
| --- | --- | --- |
| 1,460,569 | Brodesser | July 3, 1923 |
| 1,654,238 | Chandler | Dec. 27, 1927 |
| 1,945,496 | Sloan et al. | Jan. 30, 1934 |
| 1,948,185 | Padgett | Feb. 20, 1934 |
| 1,993,413 | Mellon | Mar. 5, 1935 |
| 2,114,013 | Ball | Apr. 2, 1938 |
| 2,118,944 | Purdy | May 31, 1938 |
| 2,133,161 | Colbert | Oct. 11, 1938 |
| 2,150,813 | Ball | Mar. 24, 1939 |
| 2,247,562 | Santen | July 1, 1941 |
| 2,283,476 | Waibel | May 19, 1942 |
| 2,311,682 | Murch | Feb. 23, 1943 |
| 2,314,019 | Shaw | Mar. 16, 1943 |
| 2,383,901 | Werner | Aug. 28, 1945 |